United States Patent
Beppu et al.

(10) Patent No.: US 7,312,293 B2
(45) Date of Patent: Dec. 25, 2007

(54) RELEASE AGENT COMPOSITION AND RELEASE LINER

(75) Inventors: Shiori Beppu, Warabi (JP); Atsuko Kameshima, Warabi (JP); Toshio Sugizaki, Warabi (JP)

(73) Assignee: Lintec Corporation, Tokyo (JP)

( * ) Notice: Subject to any disclaimer, the term of this patent is extended or adjusted under 35 U.S.C. 154(b) by 296 days.

(21) Appl. No.: 11/136,596

(22) Filed: May 24, 2005

(65) Prior Publication Data

US 2005/0261438 A1 Nov. 24, 2005

(30) Foreign Application Priority Data

May 24, 2004 (JP) ............................. 2004-153137

(51) Int. Cl.
C08F 20/68 (2006.01)
C08F 120/68 (2006.01)

(52) U.S. Cl. ...................... 526/318; 525/374; 525/379

(58) Field of Classification Search ................ 526/318; 525/374, 379

See application file for complete search history.

(56) References Cited

FOREIGN PATENT DOCUMENTS

| JP | 2000-290610 A | 10/2000 | |
|---|---|---|---|
| JP | 2003-003032 | * | 1/2003 |
| JP | 2003-147327 | * | 5/2003 |
| JP | 2003-147327 A | | 5/2003 |
| JP | 2003-183619 A | | 7/2003 |

* cited by examiner

*Primary Examiner*—Ling-Sui Choi
(74) *Attorney, Agent, or Firm*—The Webb Law Firm, P.C.

(57) ABSTRACT

An acrylic resin type release agent composition comprising (A) a polymer which comprises a (meth)acrylate containing a constituent unit represented by the following formula (1) and (B) a crosslinking agent which comprises an amino resin, wherein a weight ratio (A)/(B) is in the range of 99.99/0.1 to 30/70:

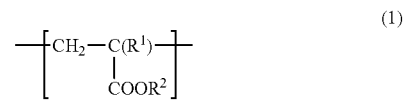

(1)

wherein $R^1$ is a hydrogen atom or a methyl group, and $R^2$ is a long-chain alkyl group of 12 to 28 carbon atoms. Also described herein is a release liner having a release layer made of the release agent composition. The acrylic resin type release agent composition exhibits excellent solvent resistance, heat resistance and adhesion to substrate without exerting evil influence on electronic parts and the like, and is capable of controlling peel strength.

12 Claims, No Drawings

RELEASE AGENT COMPOSITION AND RELEASE LINER

FIELD OF THE INVENTION

The present invention relates to a release agent composition and a release liner. More particularly, the invention relates to a release agent composition containing a poly(meth)acrylate as a major agent and an amino resin as a crosslinking agent, and a release liner having a release layer made of the composition on a substrate.

BACKGROUND OF THE INVENTION

In the process for manufacturing semiconductor devices, pressure sensitive adhesive sheets have been heretofore employed, and in general, on a pressure sensitive adhesive layer of such a pressure sensitive adhesive sheet, a release liner having on a substrate a release layer made of a release agent composition containing a silicone compound is laminated to protect the pressure sensitive adhesive layer.

The silicone compound, however, generally has properties such that it is liable to migrate and therefore, it is thought that if such a pressure sensitive adhesive sheet is used in the field of semiconductors, the silicone compound that constitutes the release layer migrates into the pressure sensitive adhesive layer to cause troubles of circuits of the semiconductor devices. Because of this shortcoming, a release liner having a release layer made of a release agent containing no silicone compound has been desired.

As the release agent containing no silicon compound, an alkyd resin type release agent, an olefin resin type release agent, an acrylic resin type release agent having a long-chain alkyl group (also referred to as a "long-chain alkyl type release agent" hereinafter) or the like has been proposed.

The alkyd resin type release agent, however, presents a problem in that its uses are restricted because of high peel strength. The olefin resin type release agent has a problem in that a pressure sensitive adhesive layer cannot be formed on the release liner because of poor heat resistance. The long-chain alkyl type release agent presents a problem in that a pressure sensitive adhesive agent cannot be applied to the release liner because of poor solvent resistance and has a problem of poor adhesion to a substrate such as a film.

Under such circumstances as mentioned above, a release agent composition wherein an ultraviolet-curing functional group was introduced into the long-chain alkyl type resin has been proposed in order to solve the above problems of the long-chain alkyl type release agent (see, for example, Japanese Patent Laid-Open Publication No. 183619/2003). In the use of such a release agent composition, however, there occurs a problem that the apparatus for manufacturing semiconductor devices needs a measuring device or a dryer for curing ultraviolet rays.

Further, a release agent composition wherein a functional group, such as a hydroxyl group, a carboxyl group or an epoxy group, was introduced into the long-chain alkyl type resin has been proposed (see, for example, Japanese Patent Laid-Open Publication No. 147327/2003 and Japanese Patent Laid-Open Publication No. 290610/2000). However, if a functional group is introduced into the long-chain alkyl type resin that is a major agent to form a crosslinked structure, degree of freedom of the long-chain alkyl group is decreased, and therefore, surface energy of the release layer is hardly lowered, that is, there occurs a problem that control of release force becomes difficult.

It is an object of the present invention to provide a long-chain alkyl group containing acrylic resin type release agent composition which exhibits excellent solvent resistance, heat resistance and adhesion to substrate without exerting evil influence on electronic parts and the like and which is capable of controlling peel strength, and a release liner having a release layer made of the composition.

SUMMARY OF THE INVENTION

The present inventors have studied in the above problems and have found that a release agent having improved solvent resistance, heat resistance and adhesion to substrate and capable of being controlled in the peel strength can be obtained by forming a semi-IPN (interpenetrating polymer network) structure using a poly(meth)acrylate (wherein its ester part is a long-chain alkyl group) having no active site to the crosslinking reaction and a specific crosslinking agent.

That is to say, the release agent composition according to the present invention is a release agent composition comprising:

(A) a polymer comprising a (meth)acrylate containing a constituent unit (1) represented by the following formula (1):

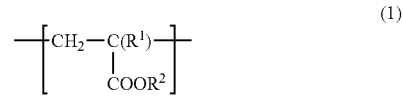

wherein $R^1$ is a hydrogen atom or a methyl group, and $R^2$ is a long-chain alkyl group of 12 to 28 carbon atoms, and (B) a crosslinking agent comprising an amino resin, wherein a weight ratio (A)/(B) of the polymer (A) to the crosslinking agent (B) is in the range of 99.99/0.01 to 30/70.

The release agent composition preferably contains an acid catalyst in an amount of 0.01 to 10 parts by weight based on 100 parts by weight of the crosslinking agent (B). The acid catalyst is preferably an inorganic acid or an organic acid.

The polymer (A) may contain a constituent unit (2) other than the constituent unit (1), in an amount of 0 to 50% by weight.

As the constituent unit (2), a constituent unit derived from a (meth)acrylate having an alkyl group of 1 to 11 carbon atoms, (meth)acrylamide or vinyl acetate is available.

The release liner according to the present invention is a release liner having a release layer made of the above-mentioned release agent composition on at least one surface of a substrate.

DETAILED DESCRIPTION OF THE INVENTION

The release agent composition according to the invention and the release liner having a release layer made of the composition are described in detail hereinafter.

Release agent composition

The release agent composition according to the present invention contains (A) a polymer comprising a (meth)acrylate (i.e., (meth)acrylate) as a major agent and (B) a crosslinking agent comprising an amino resin. The term "(meth)acrylate" used herein means both of acrylate and methacrylate.

(A) Polymer Comprising (Meth)Acrylate

The polymer comprising a (meth)acrylate (also referred to as a "polymer (A)" hereinafter) that is used as a major agent in the release agent composition of the invention contains a constituent unit represented by the following formula (1) (also referred to as a "constituent unit (1)" hereinafter) as a major constituent unit.

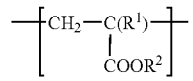
(1)

In the formula (1), $R^1$ is a hydrogen atom or a methyl group, and $R^2$ is a long-chain alkyl group of 12 to 28 carbon atoms.

If the number of carbon atoms of the alkyl group $R^2$ is less than 12, release properties tend to be lowered. If the number of carbon atoms exceeds 28, troubles sometimes occur in the handling of the composition. Therefore, when the polymer (A) has a long-chain alkyl group of 12 to 28 carbon atoms, a release layer having excellent release properties can be obtained, and besides, the composition is advantageous in the handling properties or the like.

As a monomer which can become the constituent unit (1) (also referred to as a "monomer (1)" hereinafter), a (meth) acrylate wherein the ester part is a long-chain alkyl group of 12 to 28 carbon atoms is available. Examples of such (meth)acrylates include lauryl (meth)acrylate, myristyl (meth)acrylate, palmityl (meth)acrylate, stearyl (meth)acrylate, eicosyl (meth)acrylate, docosyl (meth)acrylate, tetracosyl (meth)acrylate, hexacosyl (meth)acrylate and octacosyl (meth)acrylate. These (meth)acrylates may be used singly or in combination of two or more kinds.

Of the above (meth)acrylates, lauryl (meth)acrylate, myristyl (meth)acrylate, palmityl (meth)acrylate and stearyl (meth)acrylate are preferable.

The polymer (A) may contain a constituent unit other than the constituent unit (1) (also referred to as a "constituent unit (2)" hereinafter). As a monomer which can become the constituent unit (2) (also referred to as a "monomer (2)" hereinafter), a (meth)acrylate wherein the ester part is an alkyl group of 1 to 11 carbon atoms, (meth)acrylamide or vinyl acetate is available.

Examples of the (meth)acrylates having an alkyl group of 1 to 11 carbon atoms include methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, isopentyl (meth)acrylate, hexyl (meth)acrylate, heptyl (meth)acrylate, n-octyl (meth)acrylate, isooctyl (meth)acrylate, 2-ethylhexyl (meth)acrylate, n-decyl (meth) acrylate, isodecyl (meth)acrylate, undecyl (meth)acrylate, 2-(perfluorooctyl)ethyl (meth)acrylate, trifluoroethyl (meth) acrylate, pentafluoropropyl (meth)acrylate, 1H,1H-perfluoro-n-octyl (meth)acrylate, N,N-dimethylaminoethyl (meth)acrylate, N,N-dimethylaminopropyl (meth)acrylate, ethylene glycol methyl ether (meth)acrylate, 2-ethoxyethyl (meth)acrylate and 2-butoxyethyl (meth)acrylate.

The above monomers (2) which can become the constituent unit (2) may be used singly or in combination of two or more kinds.

The content of the constituent unit (2) in the polymer (A) is in the range of usually 0 to 50% by weight, preferably 1 to 20% by weight, more preferably 2 to 10% by weight. By introducing the constituent (2) in the above amount, peel strength of a release layer made of the release agent composition containing the polymer (A) can be controlled.

The polymer (A) can be prepared by a polymerization process publicly known, such as emulsion polymerization or solution polymerization, using the monomer (1) and if necessary the monomer (2). When a copolymer of the monomer (1) and the monomer (2) is used as the polymer (A), the copolymer may be any of a random copolymer and a block copolymer.

The polymer (A) for use in the invention has a weight-average molecular weight (Mw) of usually 30,000 to 2,000,000, preferably 50,000 to 1,000,000. When Mw of the polymer (A) is in the above range, the release agent composition can be favorably applied, and a release layer made of the composition exhibits excellent release properties.

(B) Crosslinking Agent Comprising Amino Resin

The release agent composition of the invention contains a crosslinking agent (B) comprising an amino resin. By forming a crosslinked structure using the amino resin, solvent resistance, heat resistance and substrate adhesion of the release layer are improved.

Since the polymer (A) does not have a crosslink point with the crosslinking agent (B), a crosslinked structure attributable to covalent bonding between the polymer (A) and the crosslinking agent (B) is not formed, but a semi-IPN structure due to the polymer (A) and the crosslinking agent (B) is formed. By virtue of the semi-IPN structure, degree of freedom of the long-chain alkyl group of the polymer (A) can be secured, so that it becomes possible to design a release layer so as to have a low surface energy, and a favorable gradient film can be formed.

The amino resin for use in the invention is not specifically restricted provided that it is an amino resin capable of forming a crosslinked structure. For example, a melamine compound, a guanamine compound or a urea compound is employable. More specifically, there can be mentioned a partially or completely etherified compound obtained by allowing a methylolated melamine derivative, a methylolated guanamine derivative or a methylolated urea derivate, which is obtained by addition reaction of melamine, guanamine or urea with formaldehyde in a basic atmosphere, to react with a lower alcohol such as methyl alcohol, ethyl alcohol, isopropyl alcohol or butyl alcohol. Examples of such compounds are given below with their chemical formulas.

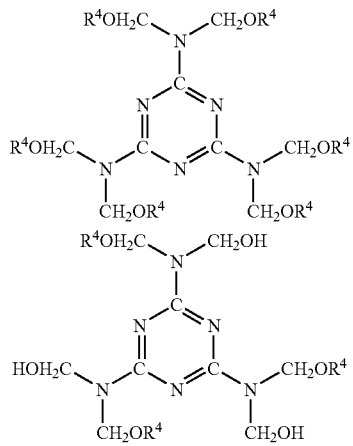

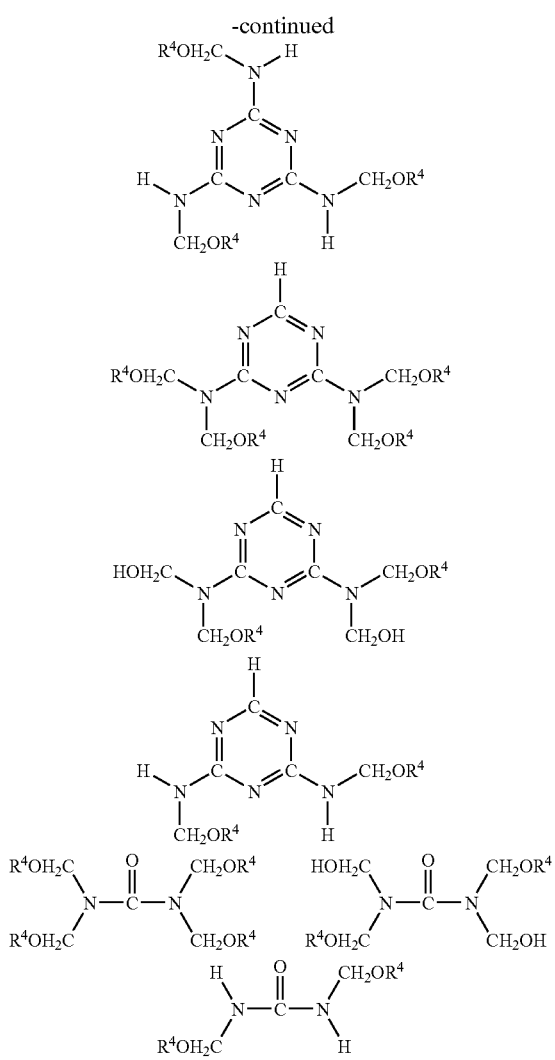

In each of the above chemical formulas, each $R^4$ may be the same or different and is an alkyl group, such as methyl, ethyl, propyl, butyl or pentyl.

In the release agent composition of the invention, the above amino resins may be used singly or in combination of two or more kinds.

In the release agent composition of the invention, a weight ratio (A)/(B) of the polymer (A) to the crosslinking agent (B) is in the range of usually 99.99/0.01 to 30/70, preferably .99/1 to 60/40. The weight ratio of the component (A) to the component (B) is in the above range, the semi-IPN structure due to the components (A) and (B) is favorably formed, and therefore, a release layer excellent in solvent resistance, heat resistance and adhesion to substrate can be formed.

In the release agent composition of the invention, an acid catalyst may be contained in order to accelerate formation of a crosslinked structure due to the amino resin. The acid catalyst referred to herein means a compound having acidic characteristics among the compounds that exert catalytic action. As the acid catalyst, an inorganic acid or an organic acid is available. Examples of the inorganic acids include hydrochloric acid, sulfuric acid, phosphoric acid and dimethylsulfuric acid. Examples of the organic acids include saturated monocarboxylic acids, such as formic acid, acetic acid and propionic acid; and sulfonic acids, such as methanesulfonic acid, ethanesulfonic acid, benzenesulfonic acid and p-toluenesulfonic acid. Of these, hydrochloric acid and p-toluenesulfonic acid are preferable.

The acid catalysts such as the above-mentioned inorganic acids and organic acids may be used singly or in combination of two or more kinds. The acid catalyst is used in an amount of usually 0.01 to 10 parts by weight, preferably 0.1 to 5 parts by weight, based on 100 parts by weight of the crosslinking agent (B). When the amount of the acid catalyst is in the above range, crosslinking reaction of the amino resin proceeds sufficiently, and a favorable crosslinked structure can be formed.

The release agent composition of the invention can be obtained by mixing or reacting the above components with each other. From the viewpoints of coating properties and handling properties, the release agent composition usually contains an organic solvent. As the organic solvent, a solvent which has excellent solubility for each component and is unreactive to each component can be employed without any restriction. Examples of such solvents include toluene, xylene, methanol, ethanol, isobutanol, n-butanol, ethyl acetate, methyl ethyl ketone, acetone, tetrahydrofuran, isopropanol, dimethylformamide and N-methylpyrrolidone. These solvents may be used singly or in combination of two or more kinds.

The organic solvent is used in such an amount that the resin solids content in the release agent composition is in the range of 1 to 60% by weight, preferably 1 to 20% by weight.

To the release agent composition of the invention, other additives, such as antistatic agent, surface active agent, antioxidant, lubricant, flame retardant, colorant, light stabilizer and heat stabilizer, may be added within limits not detrimental to the objects of the present invention.

Release liner

The release liner according to the present invention has a release layer made of the above-described release agent composition on surface of a substrate. As the substrate, a substrate that is usually used can be used without any restriction.

Examples of such substrates include:

resin films made of resins, such as polyethylene, polypropylene, polybutene, polybutadiene, vinyl chloride, polyethylene terephthalate, polyethylene naphthalate, polybutylene terephthalate, polyimide, polyether imide, polyether ketone, polyether ether ketone, an ethylene/vinyl acetate copolymer, an ethylene/(meth)acrylic acid copolymer, polycarbonate, polymethyl methacrylate, triacetyl cellulose and polynorbornene;

papers, such as wood free paper, lint-free paper, glassine paper, clay coat paper, resin coat paper, laminated paper (polyethylene laminated paper, polypropylene laminated paper, etc.);

nonwoven fabrics; and metal foils.

The thickness of the substrate varies depending upon the purpose, the type of the substrate, etc., but when a resin film is used as the substrate, the thickness is in the range of usually about 5 to 300 μm, preferably about 20 to 200 μm, and when a paper substrate is used, the thickness is in the range of usually about 20 to 450 g/m², preferably 40 to 220 g/m², in terms of a weight.

The release layer can be formed by applying the release agent composition on the substrate through a publicly known method such as gravure coating, roll coating, blade coating, knife coating, bar coating or spray coating, and then drying the composition. The thickness of the release layer is in the range of usually 0.01 to 15 μm, preferably 0.05 to 10 μm.

The release layer formed as above is excellent in solvent resistance, heat resistance, adhesion to a substrate, etc. Although the peel strength required for the release layer varies depending upon the type of a member to be laminated on the release liner or the purpose, a desired peel strength can be obtained by controlling the type or the content of the constituent unit (2) in the polymer (A) for constituting the release agent composition.

Because the release liner of the invention has a release layer that is excellent in solvent resistance, heat resistance, adhesion to a substrate, etc, it can be applied to various uses, and for example, it can be used as a release liner in pressure sensitive adhesive products, such as pressure sensitive adhesive sheets, tapes and labels, or as a release liner used in the manufacture of artificial leathers. Particularly, because the release liner of the invention contains no silicone compound in the release layer, it can be favorably used as a release liner for a pressure sensitive adhesive sheet that is used in the manufacture of semiconductor devices.

The release agent composition of the invention has excellent solvent resistance and heat resistance. Therefore, a pressure sensitive adhesive layer can be formed by applying a solvent type pressure sensitive adhesive onto a release liner having a release layer made of the release agent composition and, in addition, a release layer having excellent adhesion to a substrate such as a film can be formed.

The release agent composition of the invention has a semi-IPN structure formed by a long-chain alkyl type resin and an amino resin, differently from a conventional release agent composition having a crosslinked structure of a long-chain alkyl type resin that is formed by introducing a functional group. Therefore, it becomes possible to design a release layer made of the release agent composition so as to have a low surface energy and thereby increase adhesion force to the substrate, so that an gradient film desirable as a release layer can be formed.

According to the present invention, further, peel strength can be controlled by selecting a monomer copolymerized with the long-chain alkyl type resin that is a major agent, and therefore, release liners fit for various uses can be provided.

According to the present invention, furthermore, no silicone compound is used, and therefore, even when a pressure sensitive adhesive sheet on which the release liner of the invention has been laminated is used in the process for manufacturing electronic parts such as semiconductor devices, there is no fear of evil influence due to migration of a silicone compound on the electronic parts.

EXAMPLES

The present invention is further described with reference to the following examples, but it should be understood that the invention is in no way limited to those examples.

In the examples, the weight-average molecular weight is a weight-average molecular weight in terms of polystyrene as measured by gel permeation chromatography (GPC) under the following conditions.

Measuring Conditions

GPC measuring device: HLC-8020 manufacture by TOSOH CORPORATION

GPC columns (passage in the following order): manufactured by TOSOH CORPORATION

TSK guard column HXL-H

TSK gel GMHXL (×2)

TSK gel G2000HXL

Measuring solvent: tetrahydrofuran

Measuring temperature: 40° C.

Synthesis Example 1

Synthesis of Polymer (A)

In a 1-liter flask equipped with a stirrer, a nitrogen feed pipe, a thermometer and a condenser, 100 g of stearyl acrylate, 0.5 g of azobisisobutyronitrile (AIBN) and 200 ml of toluene were placed, and polymerization reaction was performed at 70° C. for 12 hours in a stream of nitrogen to obtain polystearyl acrylate (also referred to as "PSA" hereinafter). The resulting PSA had a weight-average molecular weight of 59,000.

Synthesis Example 2

Synthesis of Polymer (A)

In a 1-liter flask equipped with a stirrer, a nitrogen feed pipe, a thermometer and a condenser, 90 g of stearyl acrylate, 10 g of 2-(perfluorooctyl)ethyl acrylate, 0.45 g of AIBN and 200 ml of toluene were placed, and polymerization reaction was performed at 70° C. for 12 hours in a stream of nitrogen to obtain a copolymer of stearyl acrylate and 2-(perfluorooctyl)ethyl acrylate (also referred to as "PFBSA" hereinafter). The resulting PF8SA had a weight-average molecular weight of 53,000.

Synthesis Example 3

Synthesis of Polymer (A)

In a 1-liter flask equipped with a stirrer, a nitrogen feed pipe, a thermometer and a condenser, 100 g of isooctyl acrylate, 0.45 g of AIBN and 200 ml of ethyl acetate were placed, and polymerization reaction was performed at 70° C. for 12 hours in a stream of nitrogen to obtain polyisooctyl acrylate (also referred to as "POA" hereinafter). The resulting POA had a weight-average molecular weight of 86,000.

Example 1

To 100 g of PSA obtained in Synthesis Example 1, 1 g of a commercial amino resin (TESFINE 303 available from Hitachi Kasei Polymer Co., Ltd., also referred to as an "amino resin (I)" hereinafter) and 0.03 g of paratoluenesulfonic acid were added. The resulting mixture was diluted with toluene so that the solids content should become 10% by weight. Thus, a release agent composition 1 was obtained.

The resulting release agent composition 1 was applied onto a polyethylene terephthalate (PET) film having a thickness of 38 μm by means of a Meyer bar so that the dry film thickness should become 1 μm. Then, the composition was dried at 140° C. for 1 minute to obtain a release film (release liner).

Example 2

To 100 g of PF8SA obtained in Synthesis Example 2, 1 g of the amino resin (I) and 0.03 g of paratoluenesulfonic acid were added. The resulting mixture was diluted with toluene so that the solids content should become 10% by weight. Thus, a release agent composition 2 was obtained.

The resulting release agent composition 2 was applied onto a PET film having a thickness of 38 μm by means of a Meyer bar so that the dry film thickness should become 1 μm. Then, the composition was dried at 140° C. for 1 minute to obtain a release film.

Example 3

To 100 g of PSA obtained in Synthesis Example 1, 1 g of a commercial amino resin (TESAZIN 3103-60 available from Hitachi Kasei Polymer Co., Ltd., also referred to as an "amino resin (II)" hereinafter) and 0.03 g of paratoluenesulfonic acid were added. The resulting mixture was diluted with toluene so that the solids content should become 10% by weight. Thus, a release agent composition 3 was obtained.

The resulting release agent composition 3 was applied onto a PET film having a thickness of 38 μm by means of a Meyer bar so that the dry film thickness should become 1 μm. Then, the composition was dried at 140° C. for 1 minute to obtain a release film.

Example 4

To 100 g of PF8SA obtained in Synthesis Example 2, 1 g of the amino resin (II) and 0.03 g of paratoluenesulfonic acid were added. The resulting mixture was diluted with toluene so that the solids content should become 10% by weight. Thus, a release agent composition 4 was obtained.

The resulting release agent composition 4 was applied onto a PET film having a thickness of 38 μm by means of a Meyer bar so that the dry film thickness should become 1 μm. Then, the composition was dried at 140° C. for 1 minute to obtain a release film.

Comparative Example 1

PSA obtained in Synthesis Example 1 was diluted with toluene so that the solids content should become 10% by weight. Thus, a release agent composition 5 was obtained.

The resulting release agent composition 5 was applied onto a PET film having a thickness of 38 μm by means of a Meyer bar so that the dry film thickness should become 1 μm. Then, the composition was dried at 100° C. for 1 minute to obtain a release film.

Comparative Example 2

POA obtained in Synthesis Example 3 was diluted with ethyl acetate so that the solids content should become 10% by weight. Thus, a release agent composition 6 was obtained.

The resulting release agent composition 6 was applied onto a PET film having a thickness of 38 μm by means of a Meyer bar so that the dry film thickness should become 1 μm. Then, the composition was dried at 100° C. for 1 minute to obtain a release film.

Evaluation

The release films obtained in Examples 1 to 4 and Comparative Examples 1 and 2 were subjected to the following evaluation. The results are set forth in Table 1.

Solvent Resistance

Onto the layer (release layer) of the release agent composition of the release film obtained, a pressure sensitive adhesive (BPS-5127 available from Toyo Ink Mfg. Co., Ltd.) was applied by means of a test coater so that the thickness should become 50 μm, and the pressure sensitive adhesive was dried at 100° C. for 2 minutes. Then, the surface was visually observed. A release film wherein a change of a release layer was not observed was evaluated as "AA", and a release film wherein a release layer had swollen was evaluated as "BB".

Adhesion to Substrate

On the release layer of the release film obtained, crosscuts were made in accordance with a crosscut test (JIS K-5400). To the release layer, a silicone pressure sensitive adhesive tape (C-206 available from LINTEC Corporation) was allowed to adhere, and then the tape was peeled off from the layer. The number of squares remaining on the substrate was evaluated.

Release Properties

Onto the release layer of the release film obtained, a pressure sensitive adhesive (BPS-5127 available from Toyo Ink Mfg. Co., Ltd.) was applied by means of a test coater so that the thickness should become 50 μm, and the pressure sensitive adhesive was dried at 100° C. for 2 minutes. Then, a PET film having a thickness of 50 μm was laminated. Using the resulting laminated film, a peel strength was measured in accordance with JIS Z0237.

Heat Resistance

Onto the release layer of the release film obtained, a pressure sensitive adhesive (BPS-5127 available from Toyo Ink Mfg. Co., Ltd.) was applied by means of a test coater so that the thickness should become 50 μm, and the pressure sensitive adhesive was dried at 100° C. for 2 minutes. Then, a PET film having a thickness of 50 μm was laminated. The resulting laminated film was allowed to stand for 3 days under the conditions of a temperature of 70° C. and a pressure of 100 g/cm$^2$. Thereafter, a peel strength was measured in accordance with JIS Z0237.

TABLE 1

|  | Polymer (A) | Amino resin | Solvent resistance | Adhesion to substrate [number of squares] | Release properties [N/20 mm] | Heat resistance [N/20 mm] |
| --- | --- | --- | --- | --- | --- | --- |
| Ex. 1 | PSA | (I) | AA | 100/100 | 0.13 | 1.03 |
| Ex. 2 | PF8SA | (I) | AA | 100/100 | 0.30 | 1.77 |
| Ex. 3 | PSA | (II) | AA | 100/100 | 0.35 | 2.43 |
| Ex. 4 | PF8SA | (II) | AA | 100/100 | 0.49 | 2.17 |

TABLE 1-continued

|  | Polymer (A) | Amino resin | Solvent resistance | Adhesion to substrate [number of squares] | Release properties [N/20 mm] | Heat resistance [N/20 mm] |
|---|---|---|---|---|---|---|
| Comp Ex. 1 | PSA | — | BB | 100/100 | 0.13 | 6.22 |
| Comp Ex. 2 | POA | — | BB | 70/100 | 1.80 | 16.0 |

As shown in Table 1, the release layers made of the release agent compositions containing an amino resin (Examples 1 to 4) were excellent in solvent resistance and adhesion to substrate, and moreover, from the fact that a change of peel strength was small after the heat resistance test, it was confirmed that they were excellent also in heat resistance.

What is claimed is:

1. A release agent composition comprising:
   (A) a polymer comprising a (meth)acrylate containing a constituent unit (1) represented by the following formula (1):

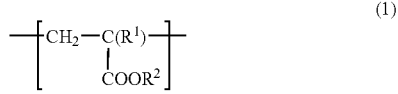 (1)

wherein $R^1$ is a hydrogen atom or a methyl group, and $R^2$ is a long-chain alkyl group of 12 to 28 carbon atoms,
   (B) a crosslinking agent comprising an amino resin, and an inorganic acid or an organic acid as an acid catalyst, wherein the polymer (A) has no crosslink point with the crosslinking agent (B), a weight ratio (A)/(B) of the polymer (A) to the crosslinking agent (B) is in the range of 99.99/0.01 to 30/70, the acid catalyst is contained in an amount of 0.01 to 10 parts by weight basd on 100 parts by weight of the crosslinking agent (B), and the release agent composition contains no silicon compound.

2. The release agent composition as claimed in claim 1, wherein the polymer (A) further contains a constituent unit (2) other than the constituent unit (1), in an amount of 1 to 50% by weight.

3. The release agent composition as claimed in claim 2, wherein the constituent unit (2) is a constituent unit derived from an alkyl (meth)acrylate having the alkyl group of 1 to 11 carbon atoms, (meth)acrylamide or vinyl acetate.

4. The release agent composition as claimed in claim 1, wherein the polymer (A) further contains a constituent unit (2) other than the constituent unit (1), in an amount of greater than 0 to 50% by weight.

5. The release agent composition as claimed in claim 1, wherein the polymer (A) further contains a constituent unit (2) other than the constituent unit (1), in an amount of greater than 0 to 50% by weight.

6. The release agent composition as claimed in claim 4, wherein the constituent unit (2) is a constituent unit derived from an alkyl (meth)acrylate having the alkyl group of 1 to 11 carbon atoms, (meth)acrylamide or vinyl acetate.

7. The release agent composition as claimed in claim 5, wherein the constituent unit (2) is a constituent unit derived from an alkyl (meth)acrylate having the alkyl group of 1 to 11 carbon atoms, (meth)acrylamide or vinyl acetate.

8. A release liner having a release layer made of the release agent composition of claim 1 on at least one surface of a substrate.

9. A release liner having a release layer made of the release agent composition of claim 1 on at least one surface of a substrate.

10. A release liner having a release layer made of the release agent composition of claim 1 on at least one surface of a substrate.

11. A release liner having a release layer made of the release agent composition of claim 2 on at least one surface of a substrate.

12. A release liner having a release layer made of the release agent composition of claim 3 on at least one surface of a substrate.

* * * * *